United States Patent
Rossignoli

(12) 
(10) Patent No.: US 6,329,039 B1
(45) Date of Patent: Dec. 11, 2001

(54) POLYOLEFIN-BACKED NYLON CARPETS WITH IMPROVED STABILITY

(75) Inventor: Paul Joseph Rossignoli, Dublin, OH (US)

(73) Assignee: AT Plastics Inc (CA)

( * ) Notice: Subject to any disclaimer, the term of this patent is extended or adjusted under 35 U.S.C. 154(b) by 0 days.

(21) Appl. No.: 09/330,482

(22) Filed: Jun. 11, 1999

(30) Foreign Application Priority Data

Jun. 4, 1999 (CA) .................................................. 2273740

(51) Int. Cl.$^7$ .............................. B32B 27/18; B32B 27/12
(52) U.S. Cl. ................................. 428/95; 428/97; 442/168
(58) Field of Search ..................... 428/95, 97; 442/168, 442/149, 62; 156/72; 427/445

(56) References Cited

U.S. PATENT DOCUMENTS

| | | | |
|---|---|---|---|
| 4,455,204 | * | 6/1984 | Pieslak et al. ........................ 204/147 |
| 5,216,054 | * | 6/1993 | Iwanami et al. ...................... 524/120 |
| 5,945,469 | * | 8/1999 | Heath et al. ............................ 524/96 |

FOREIGN PATENT DOCUMENTS 610 155 * 8/1994 (EP) ................................ C08K/5/00

OTHER PUBLICATIONS

JPO English abstract of JP 05–70016, (Oct. 1994).*
Derwent English abstact of JP 05–2927, (Jan. 1993).*
Derwent English abstract of DD 231 947, (Jan. 1996).*
Textiletech abstact of G. Reinhart, "Photostability of Polyamide Fibers," Colourage, Annual 1990–1991: 41–48 (1990).*
"Stabilization of Polyolefins in Contact With Copper", p. 28 (author unknown) (date unknown).

* cited by examiner

Primary Examiner—Cheryl Juska
(74) Attorney, Agent, or Firm—Sheridan Ross P.C.

(57) ABSTRACT

A carpet having nylon fibers containing a copper-based stabilizer has a polyolefin backing that partially envelops the nylon fibers. In the presence of the polyolefin backing, the copper induces degradation of the fibers and the backing. To prevent this degradation, a polyolefin backing of an ethylene/vinyl acetate copolymer which includes a stabilizing amount of a metal deactivator additive is employed. The metal deactivator is preferably 1,2-bis(3,5-di-tert-butyl-4-hydroxylhydrocinnamoyl) hydrazine. Such carpets are particularly suited for use in the manufacture of automotive carpets.

12 Claims, No Drawings

POLYOLEFIN-BACKED NYLON CARPETS WITH IMPROVED STABILITY

FIELD OF THE INVENTION

The present invention relates to nylon carpets with a polyolefin backing, and especially to such carpets having compositions of ethylene/vinyl acetate copolymers as backing for the nylon fibres. In particular, the invention relates to the stabilization of nylon fibres containing copper stabilizers against degradation effects on the fibres that are caused by those stabilizers in the presence of compositions of ethylene/-vinyl acetate copolymers as backing. Such carpets are particularly intended for use in the manufacture of automotive carpets.

BACKGROUND OF THE INVENTION

In the manufacture of automotive carpets, and other carpets, the back or underside of the carpet is coated with a polyolefin in order to hold the carpet fibres in place and prevent or reduce early abrasive wear and easy removal of tufts of carpet fibres from the carpet. Such a coating is frequently referred to as a pre-coat. In the form of a pre-coat, the polymer wicks into the carpet and forms both mechanical and chemical bonds to the carpet fibres. Thus, the pre-coat functions to retain the fibres in place by such mechanical and chemical bonding to the fibres.

It is understood that the carpet may have additional backing, especially for sound deadening or as backing sheets, all of which may be referred to as "massback".

A variety of polyolefins are used as pre-coat backing and as a component of sound deadening or backing sheets i.e. "massback", for automotive carpets.

Problems in the mechanical and chemical bonding of the fibres by the pre-coat have developed as a result of changes in the composition of the fibres in the carpet. Additives containing copper, especially cuprous iodide, are now incorporated into or on the nylon fibres to increase the useful life and retain the colour of the fibre. However, it has been found that in the presence of at least some polyolefin pre-coat or massback compositions, such additives actually cause a degradation reaction that affects the bonding between the fibres and the polyolefin backing. The degradation reaction results in the fibres becoming brittle and crumbling within a short period of time under conditions of heat and sunlight. Such conditions are typical ambient conditions in an automobile in many areas and at many times of the year.

SUMMARY OF THE INVENTION

It has now been found that addition of an additive to the polyolefin backing significantly increases the life of nylon fibres containing copper in carpets, especially automotive carpets, and consequently increases the life of the carpet.

Accordingly, an aspect of the present invention provides a carpet, especially an automotive carpet, comprising nylon fibres and a polyolefin backing that partially envelops said nylon fibres, said nylon fibres having a stabilizer containing copper and said polyolefin backing comprising ethylene/vinyl acetate copolymer and a stabilizing amount of an additive for stabilization of the carpet against copper-induced degradation of the fibre in the presence of such copolymer.

In a preferred embodiment of the automotive carpet, the backing comprises a pre-coat containing ethylene/vinyl acetate copolymer and said additive.

In another embodiment, the backing comprises a pre-coat and a masscoat, said pre-coat or both the pre-coat and masscoat containing ethylene/vinyl acetate copolymer and the additive.

In further embodiments, the additive is 1,2-bis(3,5-di-tert-butyl-4-hydroxyhydrocinnamoyl) hydrazine.

Another aspect of the present invention provides a method of manufacture of an automotive carpet having protection against degradation caused by heat and/or light, comprising applying a polyolefin backing to nylon fibres that have a stabilizer containing copper, said polyolefin backing comprising ethylene/vinyl acetate copolymer and an additive for stabilization of nylon fibre against copper-induced degradation of the fibre in the presence of ethylene/vinyl acetate copolymer.

During the manufacture of nylon fibres intended for use in carpets that are likely to be subjected to heat and/or light, it is to be understood that a copper stabilizer e.g. cuprous iodide (CuI), is either added to or coated onto the fibres to act as a stabilizer for the nylon. The nylon may be a variety of types of such polymer, including nylon 6,6, nylon 8 and nylon 12.

The stabilizing effect of the copper stabilizer may be observed when the fibres are exposed to heat and/or UV light. However, it has been found that when a polyolefin backing, especially a pre-coat, formed from an ethylene/vinyl acetate copolymer composition comes in contact with the fibre, the presence of copper ions in the fibre has a de-stabilizing effect on the resultant carpet and causes fibre degradation. While it is believed that both the polyolefin pre-coat and nylon fibres degrade, the effects are most apparent in the fibres. This is indicated by the colour of the pre-coat and the brittleness of the nylon fibres.

Thus, it is the object of an aspect of the present invention to provide a stabilized polyolefin composition comprising ethylene/vinylacetate copolymer that will resist degradation reactions in the fibre that are catalysed by the copper stabilizer in the nylon fibres in the presence of the polyolefin. This reaction is accelerated under conditions of heat and ultra-violet light.

It is understood that the ethylene/vinyl acetate copolymer may be all or part of the polyolefin of the pre-coat or both pre-coat and massback. The polyolefin containing ethylene/vinyl acetate contains the stabilizer that reduces or permits degradation of the nylon of the fibre.

The phenomena can be observed on carpets that have been obtained from cars which have received excessive heat and sunlight, and on carpet samples that have been aged in dry heat or in the presence of Xenon light. It will be noted that the copper stabilizer (CuI) which was added to stabilize the nylon, ultimately promotes carpet degradation and especially promotes fibre degradation.

As exemplified herein, a number of antioxidants such as phenolics and hindered amines were tested but found not to significantly reduce the degradation of the nylon fibres.

It has been found that the addition of metal certain additives, especially de-activators, for instance Irganox™ MD 1024 metal deactivator to polyolefin backings containing ethylene/vinyl acetate copolymers, particularly ethylene/vinyl acetate copolymer carpet pre-coat, reduces degradation of the nylon carpet fibres containing CuI stabilizer.

Thus, it is believed that the copper stabilizer in the nylon fibre is actually promoting degradation of the fibre it is intended to protect, when ethylene/vinyl acetate copolymer is used in the backing.

Irganox MD 1024 metal deactivator is 1,2-bis(3,5-di-tert-butyl-4-hydroxy-hydrocinnamoyl)hydrazine, and the chemical structure is given in FIG. 1.

FIG. 1

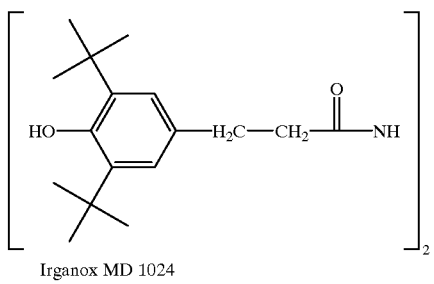

Irganox MD 1024

This type of additive is commonly referred to as a metal de-activator, of which Irganox MD 1024 metal deactivator is one example. Other metal deactivators may be used but 1,2-bis(3,5-di-tert-butyl-4-hydroxyhydro-cinnamoyl) hydrazine i.e. Irganoz MD 1024, is preferred.

A preferred additive level is from 500 ppm to 1000 ppm, although other levels may also be used.

The present invention provides carpet comprising copper-stabilized nylon fibres and polyolefin backing ethylene/vinyl acetate copolymer with improved stability against degradation. While the invention is particularly directed to automotive carpet, it also relates to other carpets that might be subjected to heat and/or ultraviolet light. subjected to heat and/or ultraviolet light.

The present invention is illustrated by the following examples.

EXAMPLE I

A variety of stabilizers were compounded into an ethylene/vinyl article (EVA) copolymer having 4% vinyl acetate, using a single screw extruder. The compositions were extrusion coated onto nylon fibres (nylon 6,6). Nylon fibres both natural and dyed, and both stabilized with copper and not, were used.

The stabilizers were a phenolic antioxidant viz. Irganox™ 1010 which is tetrakis (methylene(3,5, Di-t-butyl4-hydroxyhydrocinnamate)methane; a hindered amine antioxidant viz. Chemisorb™ 944 which is Poly[(1,1,3,3-tetramethylbutyl)amino]-5-triazine-2,4 diyl{(2,2,6,6-tetramethyl-4-peperidyl)Imino]hexamethyl[(2,2,6,6-tetra-4-pipyridyl)Imine]]; and a metal deactivator viz. Irganox™ MD 1024 which is 1,2-bis(3,5-di-tert-butyl-4-hydroxyhydro-cinnamoyl)-hydrazine.

The compositions are given in Table I.

TABLE 1

| | | | Composition | | |
|---|---|---|---|---|---|
| Run | COLOUR | CuI | Phenolic (ppm) | Hindered amine (ppm) | Metal Deactivator (ppm) |
| 1 | Natural | Yes | 750 | 750 | 750 |
| 2 | Natural | Yes | 750 | 0 | 0 |
| 3 | Natural | Yes | 0 | 750 | 0 |
| 4 | Natural | Yes | 0 | 0 | 750 |
| 5 | Natural | No | 750 | 750 | 0 |
| 6 | Natural | No | 750 | 0 | 750 |
| 7 | Natural | No | 0 | 750 | 750 |
| 8 | Natural | No | 0 | 0 | 0 |
| 9 | Brown | Yes | 750 | 750 | 0 |
| 10 | Brown | Yes | 750 | 0 | 750 |

TABLE 1-continued

| | | | Composition | | |
|---|---|---|---|---|---|
| Run | COLOUR | CuI | Phenolic (ppm) | Hindered amine (ppm) | Metal Deactivator (ppm) |
| 11 | Brown | Yes | 0 | 750 | 750 |
| 12 | Brown | Yes | 0 | 0 | 0 |
| 13 | Brown | No | 750 | 750 | 750 |
| 14 | Brown | No | 750 | 0 | 0 |
| 15 | Brown | No | 0 | 750 | 0 |
| 16 | Brown | No | 0 | 0 | 750 |

Each composition was aged in a dry oven at 121° C. (250° F.) for 6 weeks period. At the end of the 6 week period, the fibre degradation was determined by the apparent brittleness of the fibres.

The results are given in Table 2, the Rank being a scale of 0 (none) to 10 (severe) for fibre degradation.

TABLE 2

| | Results | |
|---|---|---|
| Run | Fibre Oxidation | Rank |
| 1 | — | 0 |
| 2 | little | 7 |
| 3 | severe | 10 |
| 4 | — | 0 |
| 5 | — | 0 |
| 6 | — | 0 |
| 7 | — | 0 |
| 8 | little | 7 |
| 9 | severe | 10 |
| 10 | — | 0 |
| 11 | — | 0 |
| 12 | severe | 10 |
| 13 | — | 0 |
| 14 | — | 0 |
| 15 | — | 0 |
| 16 | — | 0 |

The results given in Table 2 show that the Irganox MD 1024 and the CuI are significant variables in the fibre degradation process. CuI causes degradation whereas Irganox MD 1024 prevents or reduces that degradation.

EXAMPLE II

The following experiment was run using 500 ppm and 1000 ppm of Irganox MD 1024 metal deactivator compounded into an ethylene/vinyl acetate (EVA) copolymer containing 18% vinyl acetate copolymer, using a single screw extruder. All samples also contained Irganox 1010 antioxidant. Nylon fibres both natural and dyed, and both stabilized with copper and not, were used. Each composition was contacted with each fibre variation and aged in a dry oven at 121° C. (250° F.) for 6 weeks.

At the end of the 6 week period, the fibre degradation was determined by the apparent brittleness of the fibres. In this experiment, no significant brittleness was observed in the fibres.

EXAMPLE III

An EVA copolymer with 18% vinyl acetate was compounded with 500 ppm Irganox 1010 antioxidant and 1000 ppm Irganox MD 1024 metal deactivator (pre-coat level 1). The same polymer was compounded with 500 ppm Irganox 1010 antioxidant and 500 ppm Irganox MD 1024 metal deactivator (pre-coat level 2). Automotive carpets made from CuI stabilized nylon and polypropylene fibres were backed with these compositions and with the EVA without additives (control). The carpets were tested in a dry oven at 250° F. and in Xenon light at 215° F. to simulate the effect of installation in automobiles. Fiber failure was measured by the manual fiber pull test conducted every 72 hours. Failure occurred when the fibres could be easily plucked from the test sample by hand. The results are given in Table 3.

TABLE 3

| SAMPLE* | Hours at 250° F. | Xenon kj/m² | Colour Properties | # Langleys Until Failure Fiber | Loss Test | # Weeks |
|---|---|---|---|---|---|---|
| Nylon 12¹ oz control precoat | fail @ 864 hrs | Fail @ 784 kj | OK | Fail @ 77,900 | Failure | 16 |
| Nylon 12 oz level 1 precoat | 3144 hrs | Fail @ 784 kj | OK | 105,013 | OK | 21 |
| Nylon 12 oz level 2 precoat | 3072 hrs | Fail @ 784 kj | OK | 105,013 | OK | 21 |
| Nylon 8¹ oz control precoat | fail @ 788 hrs | Fail @ 676 kj | OK | Fail @ 45,000 | Failure | 9 |
| Nylon 8 oz level 1 precoat | 3144 hrs | Fail @ 784 kj | OK | 105,013 | OK | 21 |
| Nylon 8 oz level 2 precoat | 3144 hrs | Fail @ 784 kj | OK | 105,013 | OK | 21 |
| Nylon 12² oz control precoat | fail @ 144 hrs | Fail @ 660 kj | OK | Fail @ 30,000 | Failure | 9 |
| Nylon 12 oz level 1 precoat | 3144 hrs | Fail @ 1015 kj | OK | 105,013 | OK | 21 |
| Nylon 12 oz level 2 precoat | Fail @ 1680 hrs | Fail @ 1015 kj | OK | 105,013 | OK | 21 |
| Polypropylene³ 14 oz, control | 3052 hrs | Fail @ 1240 kj | OK | 105,000 | OK | 16 |

*
¹obtained from DuPont
²obtained from BASF
³obtained from AMOCO

The specifications for automotive carpet include a requirement of exposure to 105 TNR Langleys at 215° F. without failure. The carpet made with the control EVA backing (no additives) passed with polypropylene fibres but failed with CuI stabilized nylon fibres. Carpet made from CuI stabilized nylon fibres and the EVA containing metal deactivators (pre-coat level 1 and pre-coat level 2) passed.

EXAMPLE IV

The CuI stablized nylon carpets made from the pre-coat backings in Example 3 (level 1 and level 2) were also backed with massback and shoddy as they would be in final use in the automobile; shoddy is a non-woven padding, obtained from chopped material. These carpets were tested as in Example 3 in the dry oven and under Xenon light, and the fiber pull determined.

The results are given in Table 4. All of the carpets failed the fiber pull requirement. As in Example III, failure occurred when the fibres could be easily plucked from the test samples by hand.

TABLE 4

| SAMPLE* | Hours at 250° F. | Colour Properties | # Langleys Until Failure Fiber | Loss Test | # Weeks |
|---|---|---|---|---|---|
| Nylon 12¹ oz control + massback | 3144 | OK | Fail @ 56,819 | Failure | 10 |
| Nylon 12 oz level 1 + massback | 3144 | OK | Fail @ 56,819 | Failure | 10 |
| Nylon 12 oz level 2 + massback | 3144 | OK | Fail @ 56,819 | | |
| Nylon 12² oz control + massback | fail @ 1454 hrs | Not Available | Fail @ 58,819 | Failure | 10 |
| Nylon 12 oz level 1 + massback | fail @ 1368 hrs | Not Available | Fail @ 56,819 | Failure | 10 |
| Nylon 12 oz level 2 + massback | fail @ 1272 hrs | Not Available | Fail @ 45,000 | Failure | 9 |

*
¹obtained from DuPont
²obtained from BASF

EXAMPLE V

An EVA copolymer with 18% vinyl acetate was compounded with 650 ppm Irganox 1010 antioxidant and 650 ppm Irganox MD 1024 metal deactivator (massback level 1) and with 2000 ppm Irganox 1010 and 2000 ppm Irganox MD 1024 metal deactivator (massback level 2). These compositions were compounded into two massback formulations consisting of up to 70 wt % inert filler, up to 5 wt % process oil, and up to 10% rubber. Automotive carpets made from CuI stabilized nylon fibres were backed with pre-coat level 2 and both massback level 1 and shoddy and massback level 2 and shoddy. These carpets were tested as in Example 3 in the dry oven and under Xenon light and the fiber pull determined.

The results are given in Table 5.

TABLE 5

| Sample | Hours at 250° F. (Fibre pull) |
|---|---|
| Nylon 12 oz control + massback | fail @ 1424 hrs |
| Nylon 12 oz level 1 + massback level 1 | >3000 hrs pass |
| Nylon 12 oz level 1 + massback level 2 | >3000 hrs pass |

EXAMPLE VI

The degradation of the CuI stabilized nylon fibres was studied by infrared analysis by an independent laboratory. Tufts of nylon were plucked out of the aged carpets that failed in the field. The top portion of the nylon fiber and the bottom portion of the fibres were analyzed by IR. The bottom portion showed more oxidative degradation than the top portion indicating the degradation was being accelerated by being in contact with the carpet backing.

What is claimed is:

1. A carpet comprising nylon fibers and a polyolefin backing that partially envelops said nylon fibers, said nylon fibers having a stabilizer containing copper and said polyolefin backing comprising ethylene/vinyl acetate copolymer and a stabilizing amount of an additive for stabilization of the carpet against copper-induced degradation in the presence of said copolymer.

2. The carpet of claim 1 in the form of automotive carpet.

3. The automotive carpet of claim 2 in which the additive is a metal deactivator.

4. The automotive carpet of claim 2 in which the additive is 1,2-bis(3,5-di-tert-butyl4-hydroxyhydrocinnamoyl) hydrazine.

5. The automotive carpet of claim 2 in which the backing comprises a pre-coat, said pre-coat containing ethylene/vinyl acetate copolymer and said additive.

6. The automotive carpet of claim 2 in which the backing comprises a pre-coat and a masscoat, said pre-coat containing ethylene/vinyl acetate copolymer and said additive.

7. The automotive carpet of claim 6 in which both the pre-coat and masscoat contain ethylene/vinyl acetate copolymer and said additive.

8. The automotive carpet of claim 5 in which the additive is 1,2-bis(3,5-di-tert-butyl4-hydroxyhydrocinnamoyl) hydrazine.

9. The automotive carpet of claim 6 in which the additive is 1,2-bis(3,5-di-tert-butyl4-hydroxyhydrocinnamoyl) hydrazine.

10. A method of manufacture of an automotive carpet having protection against degradation caused by heat and/or light, comprising adding a polyolefin backing to nylon fibers that have a stabilizer containing copper, said polyolefin backing comprising ethylene/vinyl acetate copolymer and an additive for stabilization of the carpet against copper-induced degradation in the presence of said ethylene/vinyl acetate copolymer.

11. The method of claim 10 in which the additive is 1,2-bis(3,5-di-tert-butyl4-hydroxyhydrocinnamoyl) hydrazine.

12. The method of claim 11 in which a pre-coat comprising said ethylene/vinyl acetate copolymer and additive is applied to the nylon fibres.

* * * * *